United States Patent [19]

Stickler et al.

[11] Patent Number: 5,445,563

[45] Date of Patent: Aug. 29, 1995

[54] AXIAL FLOW COMBINE HAVING A CONCENTRIC THRESHING SECTION AND AN ECCENTRIC SEPARATING SECTION

[75] Inventors: Mark F. Stickler, Silvis, Ill.; Klaus A. Braunhardt, Bettendorf, Iowa; Merle R. Gerber, Moline, Ill.

[73] Assignee: Deere & Company, Moline, Ill.

[21] Appl. No.: 397,319

[22] Filed: Mar. 2, 1995

Related U.S. Application Data

[63] Continuation of Ser. No. 86,774, Jul. 1, 1993, abandoned.

[51] Int. Cl.6 .............................................. A01F 12/18
[52] U.S. Cl. ......................................... 460/69; 460/80
[58] Field of Search ................ 460/69, 66, 80, 79, 460/119; 56/14.6

[56] References Cited

U.S. PATENT DOCUMENTS

| | | |
|---|---|---|
| 1,776,396 | 9/1930 | Schlayer . |
| 2,050,631 | 8/1936 | Schlayer . |
| 2,363,632 | 11/1944 | Weaver . |
| 4,124,032 | 11/1978 | Cowan, Jr. et al. ............... 56/14.6 |
| 4,348,855 | 9/1982 | DePauw et al. .................. 56/10.2 |
| 4,362,168 | 12/1982 | Hengen et al. . |
| 4,611,605 | 9/1986 | Hall et al. ........................ 460/80 |
| 5,078,646 | 1/1992 | Claas et al. ...................... 460/69 |
| 5,112,279 | 5/1992 | Jensen et al. .................... 460/69 |

FOREIGN PATENT DOCUMENTS

| | | |
|---|---|---|
| 0085358 | 8/1983 | Germany . |
| 3719858C1 | 7/1988 | Germany . |
| 2053644 | 2/1981 | United Kingdom . |

Primary Examiner—Terry Lee Melius

[57] ABSTRACT

An axial flow agricultural combine has a single element rotor defining a rotor axis. The rotor is housed in a rotor housing having a threshing section and a separating section. The threshing section of the rotor housing defines a threshing axis and the separating section of the rotor housing defines a separating axis. The threshing section of the rotor housing is substantially concentric with the rotor axis passing through that section. The separating section of the rotor housing is arranged eccentric to the rotor axis. The separating axis is located above the rotor axis.

10 Claims, 2 Drawing Sheets

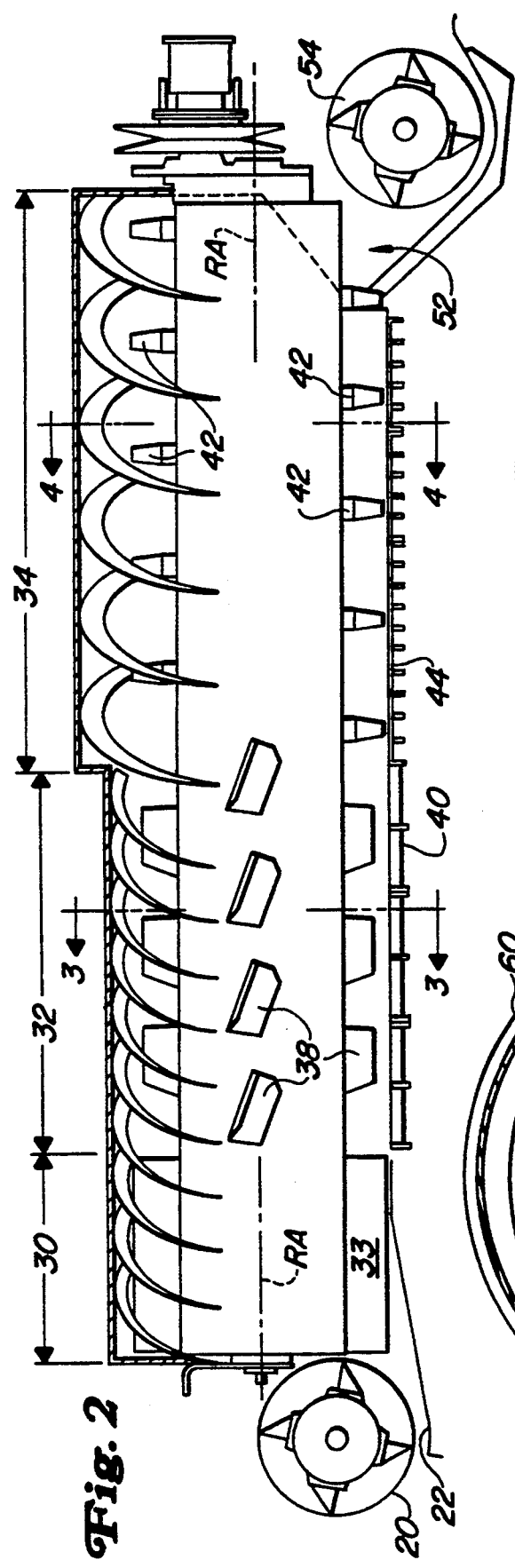
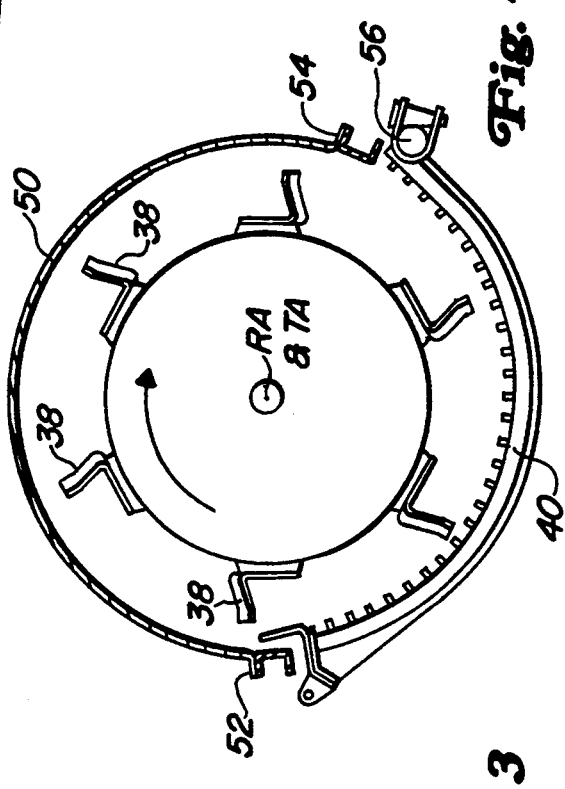
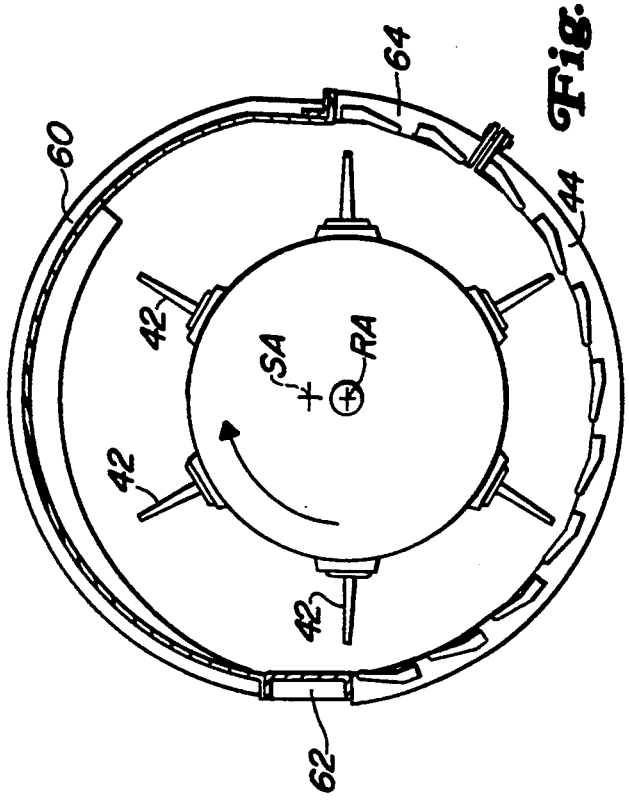

AXIAL FLOW COMBINE HAVING A CONCENTRIC THRESHING SECTION AND AN ECCENTRIC SEPARATING SECTION This application is a Continuation of application Ser. No. 08/086,774 filed Jul. 1, 1993 now abandoned.

BACKGROUND OF THE INVENTION

1. Field of the Invention

The present invention is directed to an axial flow agricultural combine having an axial flow rotor housing having a concentric threshing section and an eccentric separating section relative to an axial flow rotor housed therein.

2. Description of the Prior Art

Case IH of Racine, Wis. and New Holland, of New Holland, Penn. currently market axial flow combines. The Case IH combine is fitted with a single rotor coaxially located in a substantially cylindrical rotor housing. The rotor housing has threshing and separating sections. The New Holland combine uses two side-by-side axially aligned parallel rotors. Each rotor is housed in a substantially cylindrical rotor housing. Each rotor housing is provided with threshing and separating sections. As with the Case combine the rotor housing of the New Holland combines are concentrically arranged about the central longitudinal axis of the rotors.

The assignee of the present patent application has developed and marketed a hybrid combine having a conventional transverse threshing cylinder and an axial flow separating rotor. This hybrid system is illustrated in U.S. Pat. No. 5,112,279. The axial flow separator unit disclosed in this patent comprises a cylindrical rotor housing having a bottom portion provided with a grate and a top portion provided with helical vanes for indexing the crop material to the rear of the housing. The rotor has crop engaging assemblies that engage the crop located in the bottom portion of the housing and throws it upwardly against the helical vanes. The central longitudinal axis of the rotor is located below the central longitudinal axis of the housing making the rotor eccentric relative to the housing.

SUMMARY

It is an object of the present invention to provide an axial flow combine having a rotor housing that is provided with a threshing section that is concentrically arranged about the threshing portion of the rotor, and a separating section that is eccentrically arranged about the separating portion of the rotor.

It is a feature of the invention that the rotor is a single element arranged, on fore and aft axis within the combine.

It is another feature of the present invention that the rotor housing for the threshing and separating sections can be readily changed from being concentric to eccentric and back again.

The rotor of the present invention is a single cylindrical tube having a number of radially extending crop engaging assemblies. The rotor has an infeed portion, a threshing portion and a separating portion. The rotor defines a rotor axis that is a central longitudinal axis extending through the rotor. The rotor is housed in a rotor housing having an infeed section, a threshing section and a separating section corresponding to the respective portions of the rotor.

The threshing section of the rotor housing is substantially cylindrical and defines a threshing axis. The threshing axis is a central longitudinal axis extending through the threshing section. The threshing section of the rotor housing is concentrically arranged about the threshing portion of the rotor.

The separating section of the rotor housing has an oblong cross section and defines a separating axis. The separating axis is a central longitudinal axis extending through the separating section. The separating section rotor housing is eccentrically arranged about the separating portion of the rotor. The rotor housing is arranged so that the separating axis is parallel to and lies directly above the rotor axis.

BRIEF DESCRIPTION OF THE DRAWINGS

FIG. 2 is a cross sectional side view of the axial flow crop processing unit.

FIG. 3 is a cross sectional transverse view of the separating section taken along line 3—3 of FIG. 2.

FIG. 4 is a cross sectional transverse view of the threshing section taken along line 4—4 of FIG. 2.

DETAILED DESCRIPTION

Figure 1:
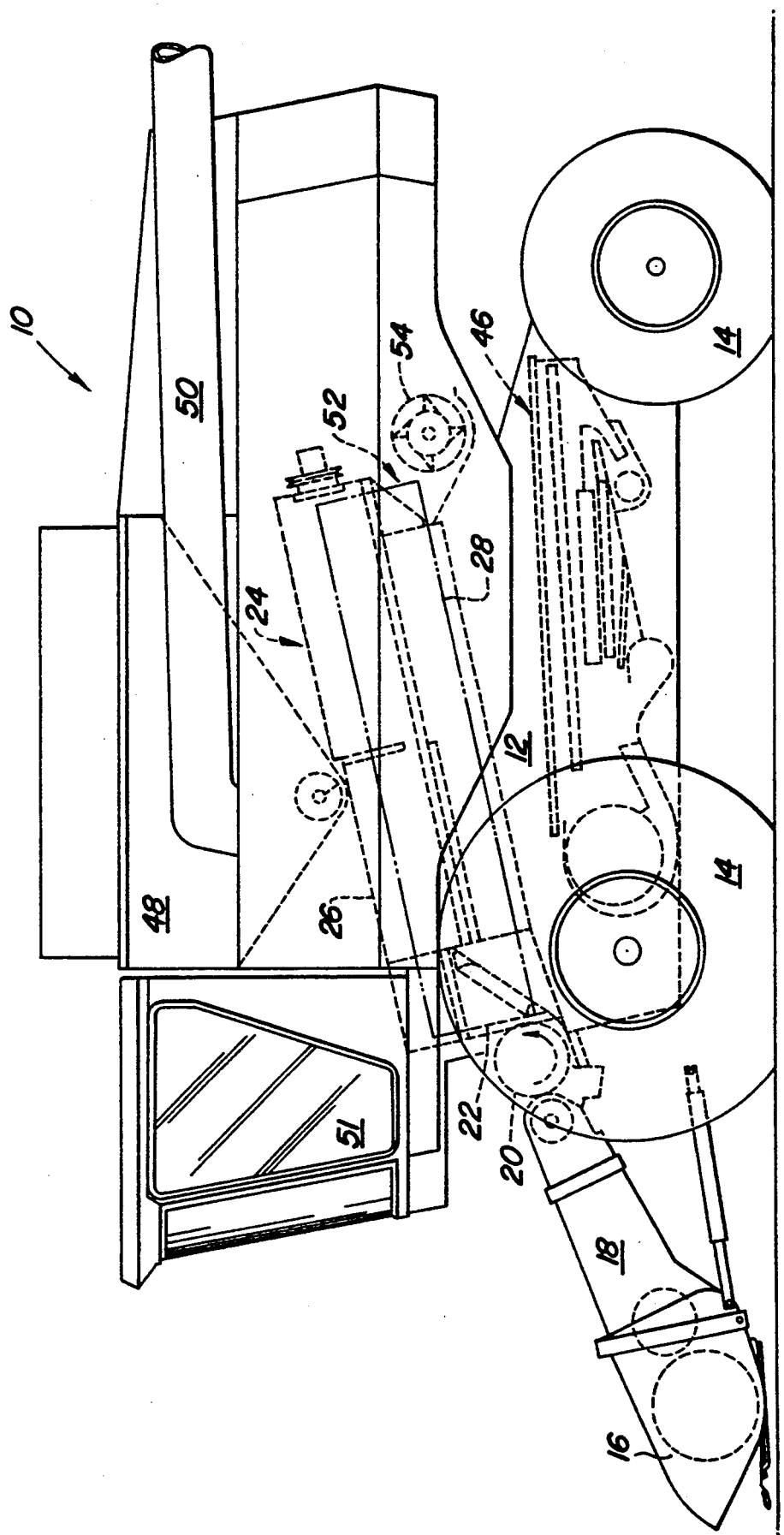
FIG. 1 is a side view of an axial flow agricultural combine.

FIG. 1 shows an agricultural combine 10 comprising a supporting structure 12 having ground engaging means 14 extending from the supporting structure. A harvesting platform 16 comprises a forward harvesting means is used for harvesting a crop and directing it to a feederhouse 18. The harvested crop is directed by the feederhouse 18 to a beater 20. The beater directs the crop upwardly through an inlet transition section 22 to the axial flow crop processing unit 24. The axial flow crop processing unit is located between the sidesheets of the combine. The sidesheets form part of the supporting structure.

The axial flow crop processing unit 24 comprises an axial rotor housing 26 and an axial flow rotor 28 located in the housing. The harvested crop enters the housing through the inlet transition section 22. The rotor is provided with an infeed section 30, a threshing section 32 and a separating section 34. The infeed section is provided with helical vanes 33 which start the harvested crop material rotating around the housing. The infeed section is provided with an inlet opening for receiving harvested crop material. The inlet opening is located at the front of the rotor housing below the rotor axis RA.

Both crop processing sections, the threshing section 32 and the separating section 34, are provided with crop engaging assemblies 38 and 42, respectively. The threshing crop engaging assemblies 38 comprise blades of the type illustrated in FIGS. 8 and 9 of U.S. Pat. No. 4,362,168. Grain and chaff released from the crop mat falls through concave 40 located on the bottom portion of the rotor housing. The concave forms a grate that prevents the passage of crop material larger than grain or chaff from entering the cleaning system 46.

The crop engaging assemblies of the separating section 34 comprise outwardly projecting separating tines 42. These tines are similar to the tines disclosed in FIGS. 11 and 12 of U.S. Pat. No. 5,112,279. The bottom portion of the housing under the separating section is provided with a grate 44 through which grain and chaff released during the separating process falls.

As illustrated in FIG. 1, grain and chaff falling through the concave 40 and grate 44 are directed to cleaning system 46 which removes the chaff from the grain. The clean grain is then directed by an elevator conveyor (not shown) to clean grain tank 48 where it can be directed to a truck or grain cart by unloading auger 49. As the straw reaches the end of the crop processing unit it is expelled through outlet 53 to beater 55. The beater propels the straw out the rear of the combine. The operation of the combine is controlled from operator's cab 51.

The rotor is arranged on a fore and aft axis in the combine and defines a rotor axis RA. The rotor axis RA is a straight line passing through the infeed, threshing and separating sections of the rotor.

As seen in FIG. 4, the threshing section is provided with a threshing cover 50 which is bolted to longitudinal rails 52 and 54. It should be noted that cover 50 is provided with helical vanes as illustrated in FIG. 2, but these have been eliminated from FIG. 4 for clarity. The concave 40 is pivotally mounted to pivot 56 located below rail 54. The pivotal movement of the concave about pivot 56, controls the clearance between the threshing section of the rotor and the concave. The clearance is adjusted for different crops and crop conditions.

The rotor housing 26 is longitudinally arranged in the combine for receiving the rotor. The threshing section of the rotor housing defines a threshing axis TA. As the concave is adjustable, the threshing section of the rotor housing is not a true cylinder. The location of the threshing axis is defined by the cover 50 and is the centerline of the cylinder defined by the threshing cover. Therefore as illustrated in FIG. 4, the threshing section of the rotor housing is substantially concentric with the threshing section of the rotor, as the threshing axis and the rotor axis are collinear.

As seen in FIG. 3, the separating section of the rotor housing is provided with a cover 60 having helical vanes. The cover is bolted to rails 62 and separating grate extension section 64. The separating section is an oblong and the rotor axis RA is located parallel to and below the separating axis SA of the separator section of the housing SA. The separating axis is defined as the centroid of the transverse cross sections extended throughout the length of the separating section. Therefore as illustrated in FIG. 3, the separating section of the rotor housing is eccentrically arranged in respect to the separating section of the rotor.

As discussed in the Summary section of this application, the present rotor housing can be readily changed from concentric to eccentric configurations and back again. More specifically, by bolting different cover assemblies, spacers and rails to the rotor housing changes, the configuration of the axial flow separating unit changes without changing the position of the rotor or the rotor axis. For example, the threshing section can be changed from a concentric section with the rotor axis to an eccentric section to the rotor axis by bolting a different cover assembly and spacers to rails 52 and 54. Similarly, the separating section can be changed into a concentric section by changing the cover 60 and the rail 62.

The present invention should not be limited by the above-described embodiment, but should be limited solely by the claims that follow.

We claim:

1. An axial flow combine for harvesting, threshing and separating crop material comprising:
   a supporting structure;
   ground engaging means extending from the suppporting structure for transparenting the supporting structure around a field;
   a rotor housing located inside the support structure, the rotor housing is provided with a threshing section in which crop material is threshed and a separating section in which threshed grain is separated from threshed crop material, the threshing grain is separated a threshing axis and the separating section defining a separating axis, the threshing section is generally cylindrical having a generally circular cross section and the separating section is a tube having a generally oblong cross section;
   a rotor located in the rotor housing having a rotor axis, the rotor is provided with crop engaging assemblies for engaging crop material passing through the rotor housing, whereby the threshing section of the rotor housing is arranged so that the threshing axis is substantially concentric with respect to the rotor axis and the separating section of the rotor housing is arranged so that the separating axis is eccentric with respect to the rotor axis.

2. An axial combine as defined by claim 1 wherein the rotor housing is arranged so that the separating axis is located parallel to and above the rotor axis.

3. An axial flow combine for harvesting, threshing and separating crop material comprising:
   a supporting structure;
   ground engaging means extending from the supporting structure for transporting the supporting structure around a field;
   a rotor housing located inside the supporting structure, the rotor housing is provided with a threshing section in which crop material is threshed and a separating section in which threshed grain is separated from threshed crop material, the threshing section defining a threshing axis and the separating section defining a separating axis, the threshing section is generally cylindrical having a generally circular cross section and the separating section is a tube having a generally oblong cross section;
   a rotor located in the rotor housing having a rotor axis, the rotor is provided with crop engaging assemblies for engaging crop material passing through the rotor housing, whereby the threshing section of the rotor housing is arranged so that the threshing axis is substantially collinear with the rotor axis and the separating section of the rotor housing is arranged so that the separating axis is located parallel to and above the rotor axis.

4. In a combine having a mobile supporting structure adapted to advance over a field and a forward harvesting means adapted to remove crop material from the field and deliver it rearwardly to an improved threshing and separating mechanism comprising:
   an elongated rotor mounted in the supporting structure for rotation about a generally fore and aft axis and having a threshing section and a rearward separating section, each section being provided with crop engaging elements; and
   a generally tubular housing mounted in the supporting structure and surrounding the rotor, the crop material being delivered from the harvesting means into the annular space between the rotor and the housing and moving rearwardly in an axial spiral, the housing including a generally cylindrical threshing section having a generally circular cross section which is generally coaxial with the rotor and a rearward separating section having a first generally semi-cylindrical portion that is generally coaxial with the rotor axis and a second generally semi-cylindrical portion having a center of curvature that is offset from the rotor axis so that the space between the rotor and the second portion of the housing separating section is greater than the space between the rotor and the first portion of the housing.

5. The invention described in claim 4 wherein the first portion of the housing separating section includes a separating grate means.

6. The invention described in claim 5 wherein the second portion of the housing separating section includes helical vanes that extend into the space between the rotor and the second portion of the separating section to engage crop material in said space and direct it in a rearward spiral.

7. The invention described in claim 6 and including a plurality of generally helical vanes mounted on the threshing section of the housing and extending into the space between the rotor and the threshing section to engage crop material therein and direct it in a rearward spiral.

8. In a combine having a mobile supporting structure adapted to advance over a filed and a forward harvesting means adapted to remove crop material from the field and deliver it rearwardly to an improved threshing and separating mechanism comprising:

an elongated rotor mounted in the supporting structure for rotation about a generally fore and aft axis and having a forward threshold section and a rearward separating section, each section being provided with crop engaging elements; and a generally tubular housing method in the supporting structure and surrounding the rotor, the crop material being delivered from the harvesting means into the annular space between the rotor and the housing and moving rearwardly in an axial spiral, the housing including a forward generally cylindrical threshing section having a generally circular cross section, generally coaxial with the rotor and including threshing grate means, and a rearward separating section having a lower generally semi-circular portion that includes a grate and an upper arcuate portion, the cross sectional area of the space between the upper portion of the separating section of the housing and the rotor periphery being substantially greater than the cross sectional area of the space between the lower portion and the rotor periphery.

9. The invention described in claim 8 wherein the upper portion of the separator section of the housing is generally semi-cylindrical and has an axis of curvature above and parallel to the rotor axis.

10. The invention described in claim 9 wherein the axis of curvature of the lower portion of the separator section is generally coaxial to the rotor axis.

* * * * *

UNITED STATES PATENT AND TRADEMARK OFFICE
CERTIFICATE OF CORRECTION

PATENT NO. : 5,445,563
DATED : August 29, 1995
INVENTOR(S) : Mark Fredrick Stickler, et al.

It is certified that error appears in the above-identified patent and that said Letters Patent is hereby corrected as shown below:

```
Column 4, line 5, delete "transparenting" and insert
--transporting--

Column 4, line 7, delete "support" and insert --supporting--

Column 4, line 12, delete "grain is separated" and insert
--section defining--

Column 5, line 31, delete "filed" and insert --field--

Column 6, line 5, delete "threshold" and insert --threshing--

Column 6, line 8, delete "method" and insert -- mounted--.
```

Signed and Sealed this

Thirtieth Day of January, 1996

*Attest:*

BRUCE LEHMAN

*Attesting Officer*  *Commissioner of Patents and Trademarks*